United States Patent [19]

Jackson et al.

[11] Patent Number: 4,616,838
[45] Date of Patent: Oct. 14, 1986

[54] WORK HOLDING DEVICES

[75] Inventors: Joseph F. Jackson, Halifax; Ralph A. Waite, Queensbury, Near Bradford, both of England

[73] Assignee: Pratt Burnerd International Limited, Halifax, England

[21] Appl. No.: 525,729

[22] Filed: Aug. 23, 1983

[30] Foreign Application Priority Data

Aug. 28, 1982 [GB] United Kingdom ............... 8224769

[51] Int. Cl.[4] .............................................. B23B 31/30
[52] U.S. Cl. .......................................... 279/4; 279/121
[58] Field of Search ............ 279/4 R, 121, 123, 1 DA

[56] References Cited

U.S. PATENT DOCUMENTS

| 2,788,979 | 4/1957 | Skillin | 279/4 |
| 3,083,025 | 3/1963 | Herbkersman | 279/4 X |
| 3,521,894 | 7/1970 | Haviland et al. | 279/4 |
| 3,954,275 | 5/1976 | Pickles | 279/4 |

FOREIGN PATENT DOCUMENTS

| 0047273 | 12/1963 | Poland | 279/4 |
| 1064708 | 4/1967 | United Kingdom | 279/4 |

Primary Examiner—Z. R. Bilinsky
Attorney, Agent, or Firm—Murray and Whisenhunt

[57] ABSTRACT

A work holding device comprises an annular cylinder 14, an annular piston 15 movable with respect to the cylinder within the cylinder in an axial direction by application of fluid pressure, and a jaw drive device 28, 29, 30, 31 projecting from the cylinder 14 for applying radial movement to a work holding jaw 12, 13. The piston and/or the cylinder co-operates with the jaw drive device within the cylinder such that axial movement of the piston with respect to the cylinder causes radial movement of the jaw drive device. Since the translation of axial to radial movement takes place effectively within the cylinder, it is possible to reduce the axial length of the work holding device as compared to known work holding devices in which translational movement occurs outside the cylinder.

14 Claims, 3 Drawing Figures

WORK HOLDING DEVICES

BACKGROUND OF THE INVENTION

The invention relates to work holding devices such as chucks.

DESCRIPTION OF THE PRIOR ART

Work holding devices are well known in which a piston and cylinder device is used to operate at least one (for example three) jaws which are movable in the radial direction with respect to the axis of the piston and cylinder device.

The piston and cylinder device may for example apply axial movement to a wedge device, the wedge device translating axial movement derived from the piston and cylinder device into radial movement of the or each jaw.

The dimensions of such work holding devices in the axial direction are governed by the need to provide the piston and cylinder device and the wedge device side by side in the axial direction.

OBJECT OF THE INVENTION

The invention seeks to provide a work holding device in which it is possible to reduce the axial dimensions as compared to a comparable work holding device of the known type.

SUMMARY OF THE INVENTION

The invention provides a work holding device comprising:
(a) a cylinder;
(b) a piston movable with respect to said cylinder within said cylinder in an axial direction by the application of fluid pressure; and
(c) a jaw drive device projecting from said cylinder, for applying radial movement to a workholding jaw, at least one of said piston and cylinder co-operating with said jaw drive device within said cylinder such that axial movement of said piston with respect to said cylinder causes radial movement of said jaw drive device.

By arranging for the translation of axial to radial movement to take place effectively within the cylinder, it is possible to reduce the axial length of the work holding device as compared to known work holding devices in which this translational movement takes place outside the cylinder.

Preferably the piston has a surface which is inclined to the axial direction and which acts in a wedge-like manner on the jaw drive device to apply radial movement to the jaw drive device as the piston moves axially.

The piston may have a passage extending therethrough which passage is inclined to the axial direction, the jaw drive device comprising a member which extends through the passage and is restrained from movement in the axial direction with respect to the piston.

The cylinder and piston may be annular so that a workpiece may pass down the centre of the cylinder and piston.

Preferably there are a plurality of passages through the annular piston, spaced circumferentially apart around the piston, there being a jaw drive device passing through each passage.

The or each jaw drive device may have faces which abut the inner end faces of the cylinder to restrain the jaw drive device against axial movement and also restrain the jaw drive device against tilting.

One or more pins fixed with respect to the cylinder may pass through the piston to prevent the piston from rotating with respect to the cylinder.

Fluid for use in operating the piston may be conveyed from one side of the piston to the other through one or more of said pins.

Other objects, preferred features and advantages will become apparent from the following description of one embodiment of the invention.

DESCRIPTION OF ONE EMBODIMENT OF THE INVENTION

Figure 1A:
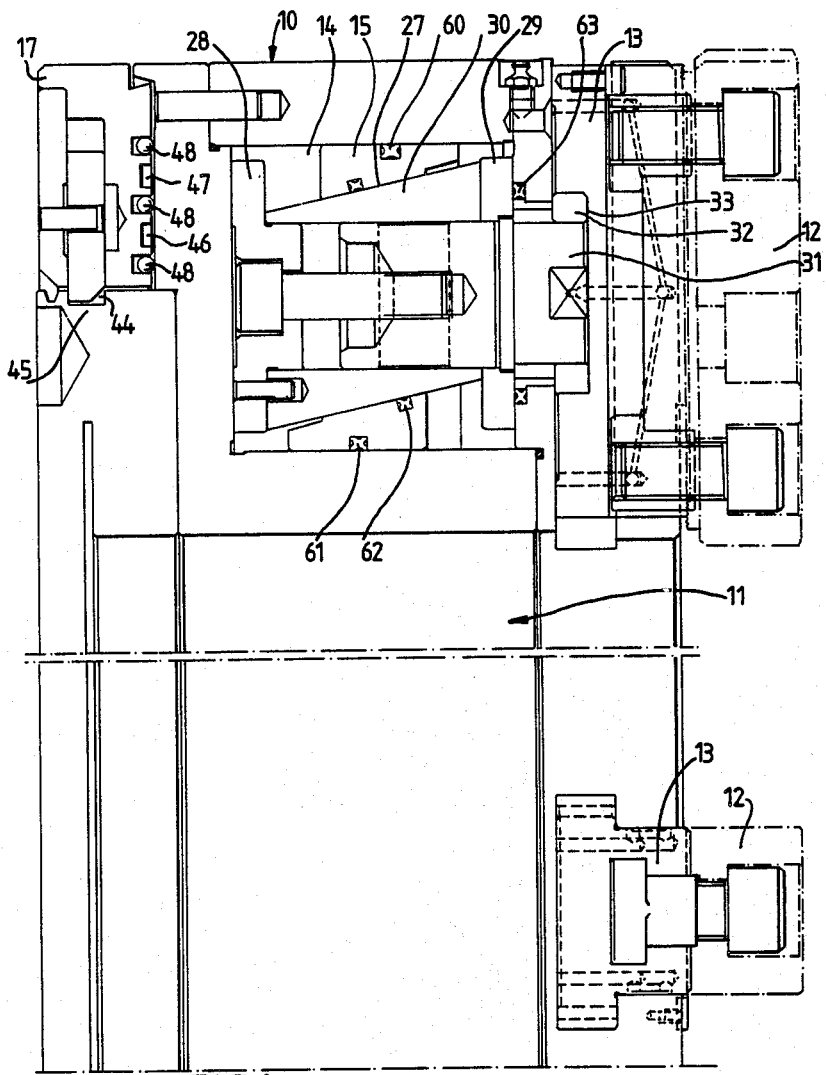
FIG. 1 (FIGS. 1a and 1b) is a cross-section through an embodiment of chuck according to the invention.

The chuck shown in the figures comprises a generally cylindrical fabricated body 10 through which there is a large diameter passage 11 so that a large diameter workpiece can pass through the body of the chuck. In order to work on the workpiece it is gripped between three top jaws, only two, 12, of which are shown in FIG. 1. Each top jaw 12 is bolted to a base jaw 13 which comprises an elongate block of metal of T cross-section which is slidable in the radial direction with respect to the cylindrical body in a T-shaped slot formed in the body.

The body 10 defines an annual pressure cylinder 14 in which an annular piston 15 is axially movable.

The piston 15 is movable to the left as viewed in FIG. 1 by applying compressed air to a first inlet 16 of a slip ring 17 which surrounds the body 10. This slip ring is described in more detail in our published European Patent Application No. 0,102,805 A2. From the inlet 16 the air passes around an annular passage 46 in the slip ring. From the annular passage the air passes through passages in the body of the chuck to the centre 20a of a pilot operated check valve device 20. The passages are not readily visible in the drawings but the beginning 20b of the passages and the end 20c of the passages are shown in dotted lines in FIG. 2. From the point 20a the air flows through the check valve 20d of the device 20 and thence to a passage 21 which leads to the right-hand side of the cylinder 14.

Figure 1B:
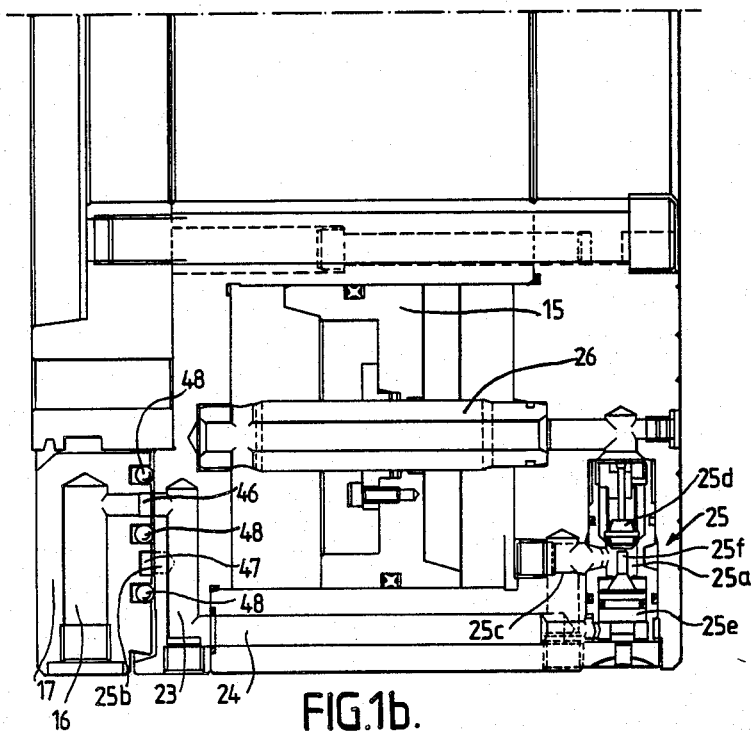
Figure 2:
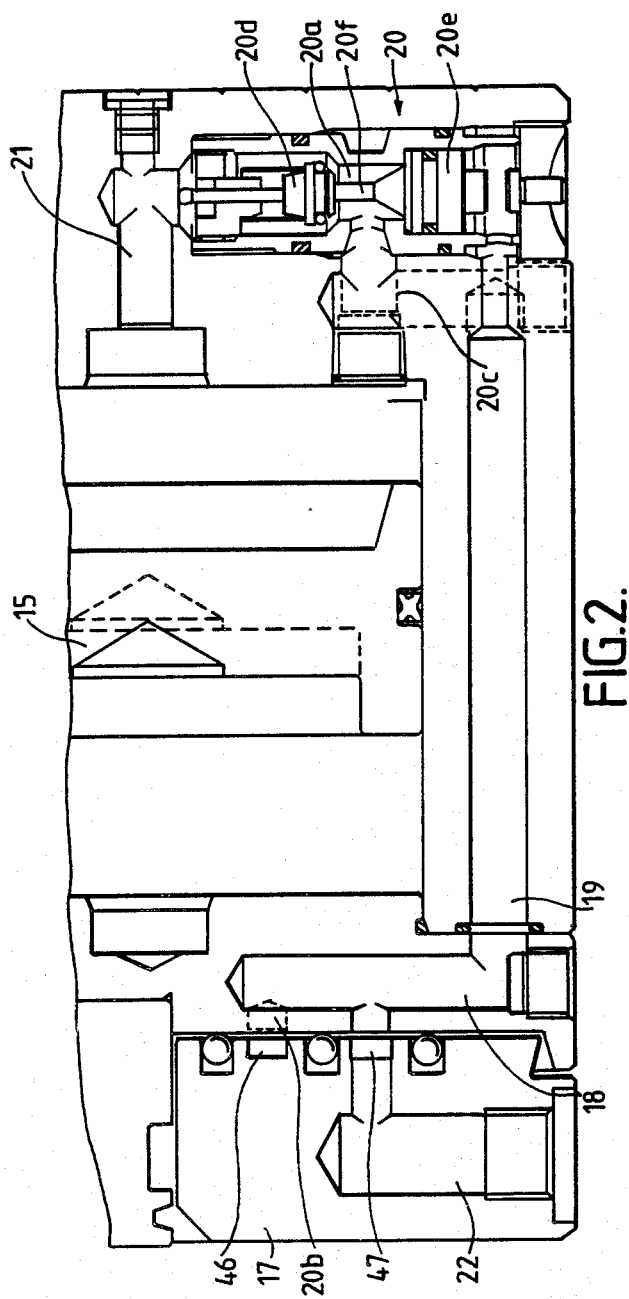
FIG. 2 is a cross-section through part of the chuck shown in FIG. 1 at a different circumferential location.

The piston 15 can be moved to the right as viewed in the Figures by applying compressed air to a second inlet 22 (see FIG. 2). Air from the inlet 22 flows around a second annular passage 47 in the slip ring. From the passage 47 air passes through passages in the chuck body to the centre 25a of a second pilot operated check valve device 25. The passages are not readily visible in the drawing but the beginning 25b and end 25c of the passages are shown in dotted lines in FIG. 1. From the point 25a the air flows through the check valve 25d of the device 25 and then through a hollow pin 26 to the left-hand side of the cylinder 14. The pin 26 is fixed with respect to the cylinder but passes through the piston 15 so as to prevent the piston 15 from rotating with respect to the cylinder.

The pilot operated check valves 20 and 25 are conventional and will not therefore be described in detail. Each of the check valves 20d and 25d normally permits flow of compressed air in one direction only. However when one valve is admitting air, the check valve of the other valve device is opened to allow air to exhaust through the other valve device. For example when air is applied to inlet 16, air from the annular passage 46 will pass through passages 23 and 24 to operate a pilot valve 25e. The valve is moved upwardly as viewed in FIG. 1 so that a spigot 25f lifts the check valve 25d off its seat. This enables air from the left-hand side of the cylinder to exhaust past the check valve 25d.

Similarly, when air is supplied to inlet 22, air from the annular passage 47 passes through passages 18 and 19 to a pilot valve 20e the spigot 20f of which then lifts the pilot valve 20d off its seat.

As can be seen from the upper part of FIG. 1, the piston 15 has a passage 27 therethrough, the axis of the passage being inclined to the axis of the chuck. There is a passage 27 adjacent each jaw of the chuck.

Co-operating with each passage 27 there is a fabricated jaw drive device comprising the following main parts: a first end plate 28 which abuts against the left-hand inner end face of the cylinder 14; a second end plate 29 which abuts against the right-hand inner end face of the cylinder 14; an elongate cylindrical cross-section member 30 which extends through the passage 27, with its axis coinciding with the inclined axis of the passage 27; and a spigot 31 which projects out of the cylinder 14. It will be readily noted that the jaw drive device extends out of passage 27 on each side of the piston.

Because of the abutment of the end plates 28 and 29 against the end faces of the cylinder 14, the jaw drive member is restrained against axial movement with respect to the cylinder. It can however move radially and when the piston 15 is moved axially, the inclined passages of the piston have a wedging action on the jaw drive members, causing them, and hence the spigots 31, to move radially.

Each spigot 31 engages in a rectangular plate 32 which in turn engages in a tangentially extending recess 33 in one of the base jaws 13. The provision of the plate 32 and its engagement in a tangentially extending recess in the base jaw allows slight play between the base jaw and the spigot 31 in the tangential direction, and makes manufacturing tolerances less critical.

It will be apparent that movement of the piston 15 to the right as viewed in FIG. 1 will cause the three spigots 31 to move radially inwardly, hence moving the base jaws and top jaws radially inwardly to grip a workpiece. Movement of the piston in the reverse direction causes the jaws to move radially outwardly to release the workpiece.

Because the motion translation mechanism which causes axial movement of the piston to be translated into radial movement is actually housed within the cylinder itself, the dimensions of the chuck in the axial direction are less than those of a conventional chuck of similar capacity. Furthermore the mechanism housed within the cylinder is protected from swarf.

As will be readily noted in FIG. 1A, the cylinder 14, piston 15, and the jaw drive device are all located proximate to the base jaws 13. The surfaces of piston 15 defining passage 17, and the corresponding surface of jaw drive member 30, form mutually abutting thrust surfaces located within cylinder 14. Because of the relative configuration of the piston and the jaw drive, it will be the surface areas at the top and bottom of bore or passage 27, relative to the access of cylinder 14, that apply pressure to the jaw drive to move the jaw drive laterally of the cylinder access, with the upper surface area applying pressure to move the jaw drive in the radially inward direction of FIG. 1A, and the bottom surface area of piston 15 applying pressure to move the jaw drive in the radially outward direction. The jaw drive will be located entirely within the walls of cylinder 14 or any axial extension thereof (with reference to spigot 31).

Ring seals 60 and 61 extend around the outer and inner peripherys respectively of the piston 15. A ring seal 62 also extends around each cylindrical member 30 to seal the associated passage 27 extending through the piston 15.

Yet another ring seal 63 extends around each spigot 31 to provide a fluid-tight face seal against the associated end plate 29 and reduce the risk of leakage out of the cylinder where the jaw drive devices emerge from the cylinder.

Clearly air is less likely to leak from the left-hand side of the cylinder than from the right-hand side, since it has to escape past at least two seals, rather than just one seal. Thus the chuck as arranged in the drawings is best used for external gripping of a workpiece, in which air will be applied to the left-hand side of the cylinder to urge the jaws radially inwardly to grip the external surface of the workpiece.

If the chuck is to be used to carry out predominantly internal gripping operations, in which the jaws will be moved radially outwardly to grip the interior of a workpiece, then the piston 15 can be removed, turned through 180° about a transverse axis, and then be replaced, the jaw drive devices each being rotated through 180° about the longitudinal axis of the chuck. The wedge action will then operate in reverse, the application of air to the left-hand side of the cylinder causing the chuck jaws to move radially outwardly.

The invention is not restricted to the details of the foregoing embodiment. For example hydraulic fluid may be used instead of compressed air.

We claim:

1. A work holding device for holding a workpiece comprising:

a cylinder having an axis and a pair of axially spaced apart end walls;

jaws movably mounted on the cylinder for holding said workpiece and movable laterally of said axis toward and away from said workpiece;

motion translation means located entirely within said cylinder and including piston means located within said cylinder for moving axially therein;

jaw drive means located within said cylinder for moving said jaws laterally of said axis;

a plurality of passages extending through said piston means, each of passages being inclined with respect to the cylinder axis, and said jaw drive means including a plurality of jaw drive members, each jaw drive member associated with a respective passage, with a portion of each jaw drive member slidably received within the respective passage, and said cylinder, said piston means, said jaw drive means and said motion translation means located proximate said jaws.

2. Device of claim 1, wherein said cylinder is an annular cylinder, and said piston means is a cylindrical piston member coaxially disposed within said cylinder, with a passage extending throughout the device inside of said cylinder and said piston means, said passage being of sufficient size that a workpiece can pass through the body of the device.

3. Device of claim 1, wherein a portion of said jaw drive means is disposed within the cylinder and includes a pair of end faces which each slidingly abut a substantial portion of a respective cylinder end wall to restrain said jaw drive means against axial movement and to restrain said jaw drive means against tilting.

4. Device of claim 1, additionally including at least one pin means, fixed with respect to said cylinder and passing through said piston means, for preventing relative rotation between said cylinder and said piston means.

5. Device as claimed in claim 4, including first conduit means for producing pressurized fluid into said cylinder between one of said end walls and said piston means, and second conduit for introducing pressurized fluid into said cylinder between the other of said end walls and said piston means, and wherein at least one pin has a fluid conduit formed therein to fluidically communicate the first conduit means with the second conduit means.

6. A workholding device comprising:
a cylinder having first and second end walls;
a plurality of work holding jaws mounted on the cylinder for radial movement with respect to said cylinder;
a piston movable with respect to said cylinder within said cylinder in an axial direction, by the application of fluid pressure;
first and second mutually abutting thrust surface means located within said cylinder, for converting said axial movement of said piston and corresponding movement of one of said thrust surface means into radial movement of the other of said thrust surface means;
fluid tight sealing means for sealing said thrust surface means within said cylinder; and
transmission means extending through said first end wall of said cylinder in sealing relationship therewith for transmitting said radial movement of said one thrust surface means to said jaws.

7. Work holding device of claim 6, wherein said first thrust surface means is defined by a thrust member mounted for radial movement in said cylinder, said thrust member having a first end face in sliding engagement with said first end wall of said cylinder, said transmission mean projecting from said first end face and sealing means located between said first end face and said first end wall for providing said sealing relationship for said transmission means.

8. Work holding device of claim 7, in which said thrust member has a second end face in sliding engagement with said second end wall of said cylinder, said piston having a bore through which said thrust member passes.

9. A work holding device for holding a workpiece comprising:
cylinder means, having an axis, a pair of axially spaced apart walls, and outer wall means joining said end walls for containing a pressurized fluid;
jaw means movably mounted on said cylinder for holding said workpiece, the jaw means being movable toward and away from said workpiece,
jaw drive means for moving said jaw means, said jaw drive means and jaw means moved thereby reciprocally movable laterally of said axis;
piston means, disposed within said cylinder means, for moving in the axial direction of said cylinder means and for applying pressure through two spaced apart surface areas to said jaw drive means to move said jaw drive means laterally of said axis with one of said surface areas applying pressure to move said jaw drive means in one lateral direction and the other of said surface areas applying pressure to move said jaw drive means in the opposite lateral direction;
said jaw drive means extending in a lateral direction from said axis entirely within said outer wall means and any axial extension thereof,
a plurality of passages extending through said piston means, each of passages being inclined with respect to the cylinder axis, and said jaw drive means including a plurality of jaw drive members, each jaw drive member associated with a respective passage, with a portion of each jaw drive member slidably received within the respective passage,
first conduit means for introducing pressurized fluid into said cylinder means between one of said end walls and said piston means;
second conduit means for introducing pressurized fluid into said cylinder walls between the other of said end walls and said piston means;
said piston means and said jaw drive means cooperating so that when pressurized fluid is introduced between said one end wall and said piston means to move said piston means in a first axial direction, said piston means applies pressure to said jaw drive means and moves said jaw drive means and jaws moved thereby in a laterally outward direction, and when said pressurized fluid is introduced between said other end wall and said piston means to move said piston means in a second axial direction opposite to said first axial direction, said piston means applies pressure to said jaw drive means to move said jaw drive means and said jaw means moved thereby laterally inward.

10. A work holding device for holding a workpiece comprising:
cylinder means, having an axis, a pair of axially spaced apart end walls, and outer wall means joining said end walls for containing a pressurized fluid;
jaw means movably mounted on said cylinder for holding said workpiece, the jaw means being movable toward and away from said workpiece,
jaw drive means for moving said jaw means, said jaw drive means and jaw means moved thereby reciprocally movable laterally of said axis;
piston means, disposed within said cylinder means, for moving in the axial direction of said cylinder means and for applying pressure through two spaced apart surface areas to said jaw drive means to move said jaw drive means laterally of said axis with one of said surface areas applying pressure to move said jaw drive means in one lateral direction and the other of said surface areas applying pressure to move said jaw drive means in the opposite lateral direction;
said jaw drive means extending in a lateral direction from said axis entirely within said outer wall means and any axial extension thereof,
a portion of said jaw drive means being disposed within the cylinder and including a pair of end faces which each slidingly abut a substantial portion of a respective cylinder end wall to restrain said jaw drive means against axial movement and to restrain said jaw drive means against tilting, first conduit means for introducing pressurized fluid into said cylinder means between one of said end walls and said piston means;

second conduit means for introducing pressurized fluid into said cylinder wall between the other of said end walls and said piston means;

said piston means and said jaw drive means cooperating so that when pressurized fluid is introduced between said one end wall and said piston means to move said piston means in a first axial direction, said piston means applies pressure to said jaw drive means and moves said jaw drive means and jaws moved thereby in a laterally outward direction, and when said pressurized fluid is introduced between said other end wall and said piston means to move said piston means in a second axial direction opposite to said first axial direction, said piston means applies pressure to said jaw drive means to move said jaw drive means and said jaw means moved thereby laterally inward.

11. Device of claim 10, wherein said cylinder means is an annular cylinder, said piston means is an annular piston member which is coaxially disposed within said cylinder, with a passage extending throughout the device inside of said cylinder and said piston means, said passage being of sufficient size that a workpiece can pass through the body of the device.

12. A work holding device of holding a workpiece comprising:

cylinder means, having an axis and a pair of axial-ly spaced apart end walls, for containing a pressurized fluid;

jaw means for holding said workpiece, said jaw means movable toward and away from workpiece, jaw drive means moving said jaw means, said jaw drive means and jaw means moved thereby reciprocally movable laterally of said axis;

piston means, disposed within said cylinder means, for applying pressure to said jaw drive means to move said jaw drive means laterally of said axis, said piston means movable in the axial direction of said cylinder means;

the piston means defining a bore extending therethrough at an angle to the axis, the jaw drive means located in part in the bore and extending out of the bore on each side of the piston, first conduit means for introducing pressurized fluid into said cylinder means between one of said end walls and said piston means;

second conduit means for introducing pressurized fluid into said cylinder walls between the other of said end walls and said piston means;

said piston means and said jaw drive means cooperating so that when pressurized fluid is introduced between said one end wall and said piston means to move said piston means in a first axial direction, said piston means applies pressure to said jaw drive means and moves said jaw drive means and jaws moved thereby in a laterally outward direction, and when said pressurized fluid is introduced between said other end wall and said piston means to move said piston means in a second axial direction opposite to said first axial direction, said piston means applies pressure to said jaw drive means to move said jaw drive means and said jaw means moved thereby laterally inward.

13. A work holding device comprising:
a cylinder having first and second end walls;
at least one work holding jaw mounted for radial movement with respect to said cylinder;
a piston movable in the axial direction with respect to said cylinder within said cylinder, by the application of fluid pressure;
piston means for axial motion within said cylinder, jaw drive means for moving said jaws radially of said axis, motion translation means for translating axial motion of said piston means into lateral motion of said jaw drive means, transmission means extending through said first end wall of said cylinder in sealing relationship therewith for transmitting said radial movement of said drive means to said jaw,
said jaw drive means having a first end face in sliding engagement with said cylinder first end wall, said transmission means projecting from said first end face, sealing means located between said first end face and said first end wall for providing said sealing relationship for said transmission means, and a second end face of said jaw drive means in sliding engagement with said second end wall of said cylinder, wherein said first and second end walls and said first and second end faces cooperate so that said jaw drive means is restrained against axial movement and against tiling in said cylinder.

14. A work holding device for holding a workpiece comprising:
cylinder means, having an axis and a pair of axially spaced apart end walls, for containing a pressurized fluid;
jaw means for holding said workpiece, said jaw means movable toward and away from said workpiece;
jaw drive means for moving said jaw means, said jaw drive means and said jaw means moved thereby being moved in a direction radially of said axis;
piston means, disposed within said cylinder means, movable in the axial direction of said cylinder means;
translational means for translating axial movement of said piston means into radial movement of said jaw drive means, and including at least one surface on said piston means and at least one mating surface on said jaw drive means, said surfaces extending at an angle to said axis, said translational means being entirely within said cylinder means;
first conduit means for introducing pressurized fluid into said cylinder means between one of said end walls and said piston means,
second conduit means for introducing pressurized fluid into said cylinder means between the other of said end walls and said piston means,
wherein said piston means and said jaw drive means cooperate so that when pressurized fluid is introduced by said first conduit means said piston means is moved in a first axial direction and applies pressure through said translation means to said jaw drive means to move said jaw drive means in a first radial direction, and when pressurized fluid is introduced through said second conduit means in said cylinder said piston means moves in an opposite second axial direction, applying pressure through said translational means to said jaw drive means to move said jaw drive means in an opposite second radial direction, whereby said jaw means move toward and away from said workpiece.

* * * * *